(12) United States Patent
Schank et al.

(10) Patent No.: US 10,946,955 B2
(45) Date of Patent: Mar. 16, 2021

(54) GIMBAL LOCK HOOK SYSTEMS FOR ROTORCRAFT

(71) Applicant: Textron Innovations Inc., Providence, RI (US)

(72) Inventors: Troy Cyril Schank, Keller, TX (US); Andrew Ryan Maresh, Lewisville, TX (US); Chyau-Song Tzeng, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 691 days.

(21) Appl. No.: 16/051,343

(22) Filed: Jul. 31, 2018

(65) Prior Publication Data

US 2019/0047692 A1    Feb. 14, 2019

Related U.S. Application Data

(63) Continuation-in-part of application No. 15/428,687, filed on Feb. 9, 2017, now Pat. No. 10,526,068, which is a continuation-in-part of application No. 14/957,321, filed on Dec. 2, 2015, now Pat. No. 10,336,447.

(60) Provisional application No. 62/086,637, filed on Dec. 2, 2014.

(51) Int. Cl.
*B64C 27/32* (2006.01)
*B64C 29/00* (2006.01)
*B64C 27/30* (2006.01)

(52) U.S. Cl.
CPC ............ *B64C 27/322* (2013.01); *B64C 27/30* (2013.01); *B64C 29/0033* (2013.01)

(58) Field of Classification Search
CPC ....... B64C 11/28; B64C 27/322; B64C 27/22; B64C 27/30
See application file for complete search history.

(56) References Cited

U.S. PATENT DOCUMENTS

| | | | |
|---|---|---|---|
| 2,861,640 A * | 11/1958 | Du Pont | ................ B64C 27/41 416/50 |
| 3,515,500 A | 6/1970 | Nachod | |
| 3,528,630 A | 9/1970 | Ferris et al. | |
| 3,592,412 A | 7/1971 | Glatfelter | |
| 6,622,962 B1 | 9/2003 | White | |
| 8,998,125 B2 | 4/2015 | Hollimon et al. | |
| 2016/0083087 A1 | 3/2016 | Schank et al. | |
| 2016/0152329 A1 | 6/2016 | Tzeng et al. | |

* cited by examiner

*Primary Examiner* — Kayla Mccaffrey
(74) *Attorney, Agent, or Firm* — Lawrence Youst PLLC

(57) ABSTRACT

A propulsion assembly for a rotorcraft includes a mast and a proprotor hub assembly coupled to the mast and having a gimballing degree of freedom relative to the mast. The proprotor hub assembly includes a hook receiver. The propulsion assembly includes a gimbal lock positioned about the mast. The gimbal lock includes a locking ring and a gimbal lock hook. The gimbal lock is movable between a disengaged position and an engaged position relative to the proprotor hub assembly. The gimbal lock enables the gimballing degree of freedom in the disengaged position and disables the gimballing degree of freedom in the engaged position. The gimbal lock hook is hooked to the hook receiver in the engaged position to secure the locking ring to the proprotor hub assembly.

19 Claims, 13 Drawing Sheets

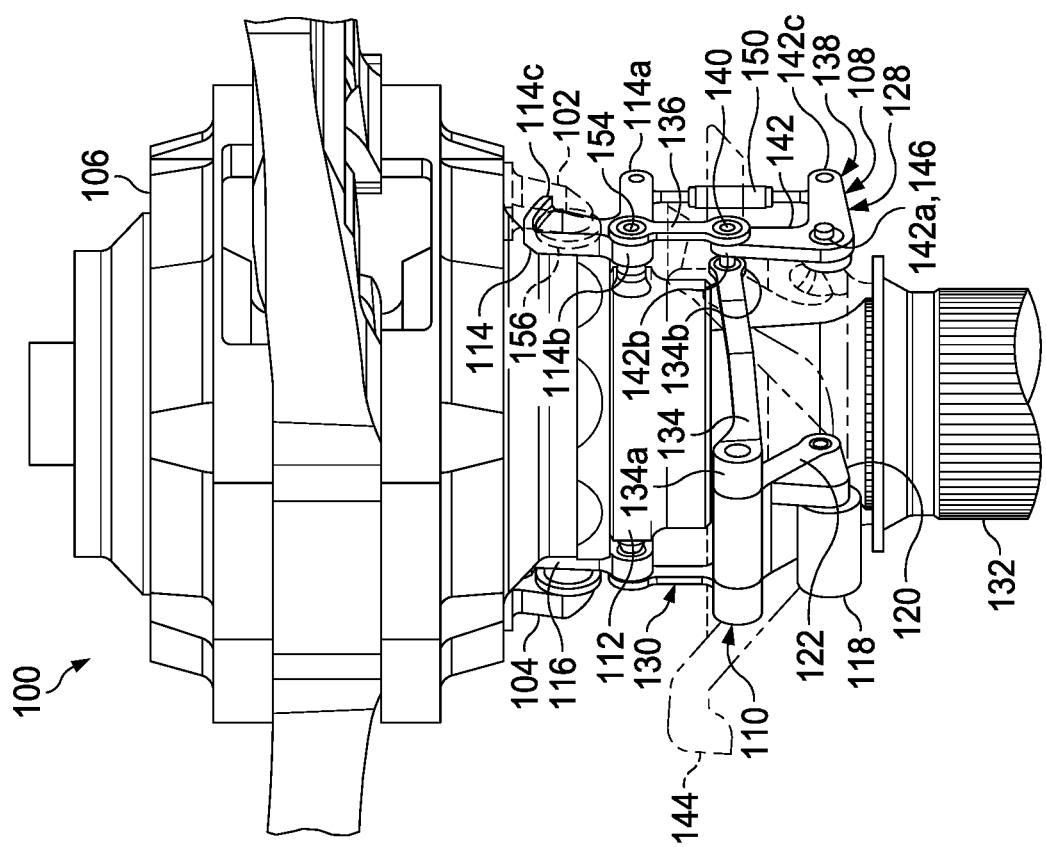
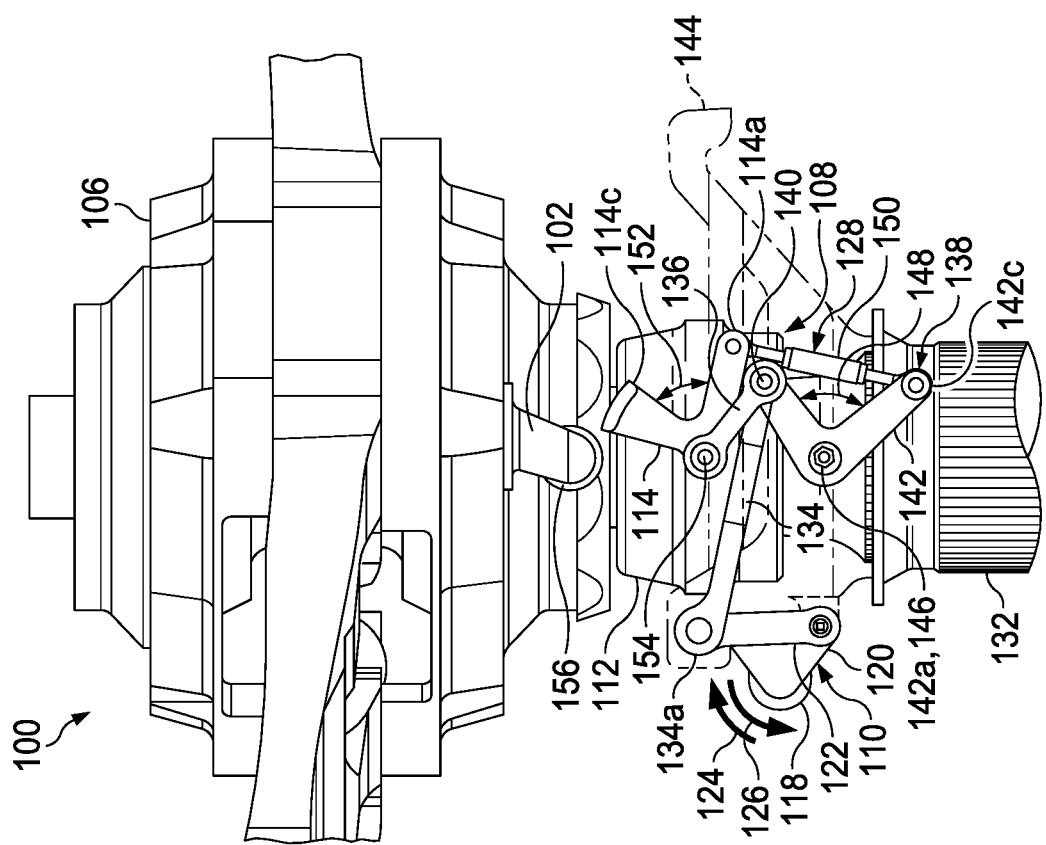
FIG. 3A
FIG. 3B

GIMBAL LOCK HOOK SYSTEMS FOR ROTORCRAFT

CROSS-REFERENCE TO RELATED APPLICATIONS

This is a continuation-in-part of co-pending application Ser. No. 15/428,687 filed Feb. 9, 2017, which is a continuation-in-part of co-pending application Ser. No. 14/957,321 filed Dec. 2, 2015, which claims the benefit of provisional application No. 62/086,637 filed Dec. 2, 2014, the entire contents of each is hereby incorporated by reference.

TECHNICAL FIELD OF THE DISCLOSURE

The present disclosure relates, in general, to rotorcraft having one or more rotors with a gimballing degree of freedom and, in particular, to gimbal lock hook systems capable of selectively hooking to rotor hub assemblies of the rotorcraft to disable the gimballing degree of freedom of the rotors, thereby increasing rotor stiffness.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of conventional tiltrotor aircraft in forward flight.

Some tiltrotor aircraft include proprotors with a gimballing degree of freedom to permit flapping. Aeroelastic forces and other phenomena can cause gimballing proprotors to overflap, especially at reduced rotational speeds, which can lead to mast bumping, large structural loads or even structural failure. Tiltrotor aircraft may thus include gimbal lock devices to prevent gimballing proprotors from overflapping. Current gimbal lock devices utilize a cone that is inserted into the proprotor hub to engage with the proprotor hub at a frictional interface that prevents rotor flapping. Gimbal lock cones with narrow angles are susceptible to binding with or becoming wedged in the proprotor hub. Conversely, gimbal lock cones with wide angles are susceptible to being pushed outward in response to the flapping forces of the rotor, resulting in less flapping stiffness. Accordingly, a need has arisen for a gimbal lock system that overcomes these and other gimbal lock deficiencies for tiltrotor aircraft and other rotorcraft types.

SUMMARY

In a first aspect, the present disclosure is directed to a propulsion assembly for a rotorcraft including a mast and a proprotor hub assembly coupled to the mast and having a gimballing degree of freedom relative to the mast. The proprotor hub assembly includes a hook receiver. The propulsion assembly includes a gimbal lock positioned about the mast. The gimbal lock includes a locking ring and a gimbal lock hook. The gimbal lock is movable between a disengaged position and an engaged position relative to the proprotor hub assembly. The gimbal lock enables the gimballing degree of freedom in the disengaged position and disables the gimballing degree of freedom in the engaged position. The gimbal lock hook is hooked to the hook receiver in the engaged position to secure the locking ring to the proprotor hub assembly.

In some embodiments, the proprotor hub assembly may include a gimbal lock receptacle extending from the proprotor hub assembly in an aft direction and adapted to receive the locking ring. In such embodiments, the locking ring may be inserted into the gimbal lock receptacle in the engaged position. In certain embodiments, the hook receiver may extend from the proprotor hub assembly in an aft direction. In some embodiments, the hook receiver may include a receiver ring. In certain embodiments, the receiver ring may be rotatable to slidably receive and release the gimbal lock hook. In some embodiments, the gimbal lock hook may form a lip protruding radially outward from the mast. In certain embodiments, the gimbal lock hook and the hook receiver may provide a load path between the locking ring and the proprotor hub assembly in the engaged position. In some embodiments, the gimbal lock hook may be unhooked from the hook receiver in the disengaged position.

In certain embodiments, the gimbal lock may include an actuation assembly to raise and lower the locking ring and rotate the gimbal lock hook. In some embodiments, the actuation assembly may have a range of motion including a locking ring axial displacement phase and a gimbal lock hook rotation phase. In certain embodiments, the actuation assembly may include an actuator, such as a rotary actuator, moveable in a first direction to raise the locking ring and hook the gimbal lock hook to the hook receiver and a second direction to lower the locking ring and unhook the gimbal lock hook from the hook receiver. In some embodiments, the actuation assembly may include an arm having a first end coupled to the actuator. In such embodiments, the actuation assembly may also include a locking ring linkage coupling the second end of the arm to the locking ring and a hook linkage subassembly coupling the second end of the arm to the gimbal lock hook. In certain embodiments, the second end of the arm, the locking ring linkage and the hook linkage subassembly may be rotatably coupled at a common revolute joint. In some embodiments, the hook linkage subassembly may include an angle bracket rotatable about a vertex and having a first end coupled to the second end of the arm. In such embodiments, the hook linkage subassembly may also include a riser having a bottom end coupled to the second end of the angle bracket and a top end coupled to the gimbal lock hook. In certain embodiments, the riser may have an adjustable length to coordinate axial motion of the locking ring with the rotation of the gimbal lock hook. In some embodiments, the vertex of the angle bracket may form an elongated slot permitting the angle bracket to move toward the proprotor hub assembly in response to the locking ring engaging with the proprotor hub assembly. In certain embodiments, the gimbal lock hook may include a leg coupled to the top end of the riser. In some embodiments, the gimbal lock hook may form an angle including a vertex coupled to the locking ring. In certain embodiments, the locking ring, the locking ring linkage and the vertex of the gimbal lock hook may be rotatably coupled at a common revolute joint.

In a second aspect, the present disclosure is directed to a tiltrotor aircraft including a fuselage, a wing coupled to the fuselage and a propulsion assembly rotatably coupled to the wing. The propulsion assembly includes a mast and a proprotor hub assembly coupled to the mast and having a gimballing degree of freedom relative to the mast. The proprotor hub assembly includes first and second hook receivers. The propulsion assembly includes a gimbal lock positioned about the mast. The gimbal lock includes a locking ring and first and second gimbal lock hooks. The gimbal lock is movable between a disengaged position and an engaged position relative to the proprotor hub assembly. The gimbal lock enables the gimballing degree of freedom in the disengaged position and disables the gimballing degree of freedom in the engaged position. The gimbal lock hooks are hooked to the hook receivers in the engaged position to secure the locking ring to the proprotor hub assembly.

In some embodiments, the first hook receiver and the first gimbal lock hook may be disposed on an opposite side of the mast than the second hook receiver and the second gimbal lock hook. In certain embodiments, the locking ring may fully engage with the proprotor hub assembly prior to the gimbal lock hooks fully hooking to the hook receivers as the gimbal lock moves from the disengaged position to the engaged position. In some embodiments, the locking ring may conical and annular.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3D are various views of a gimbal lock hooking system in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
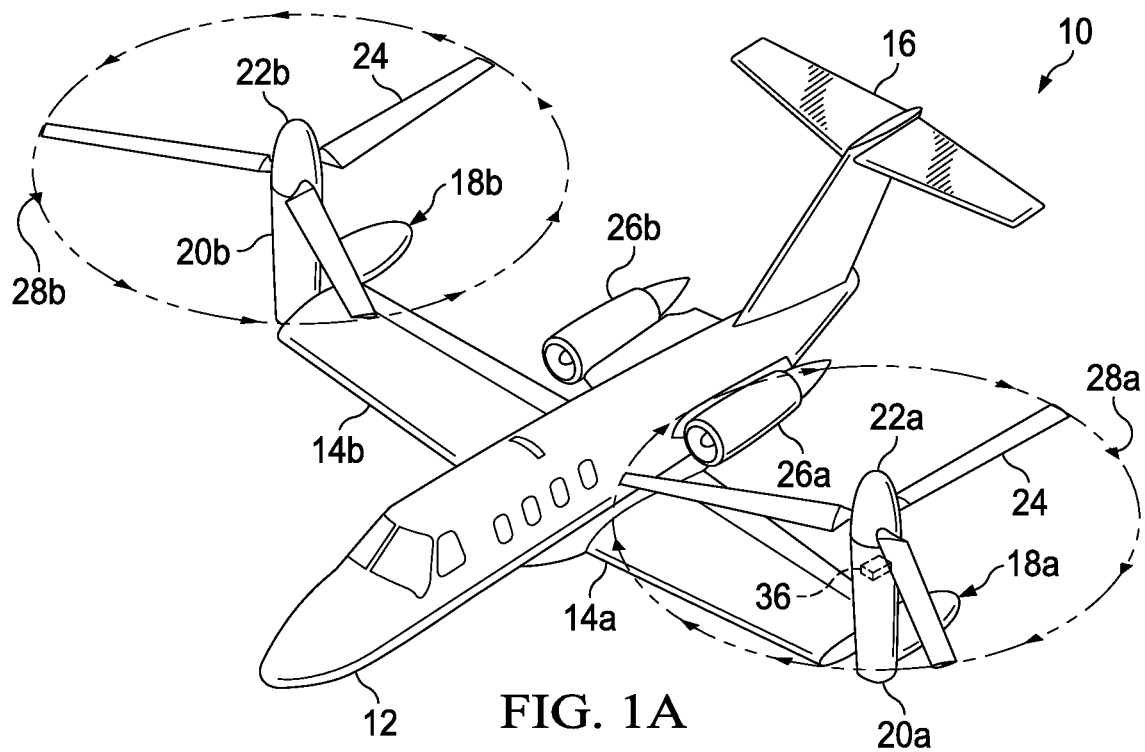
FIGS. 1A-1F are schematic illustrations of a tiltrotor aircraft in various flight modes in accordance with embodiments of the present disclosure.
Figure 1B:
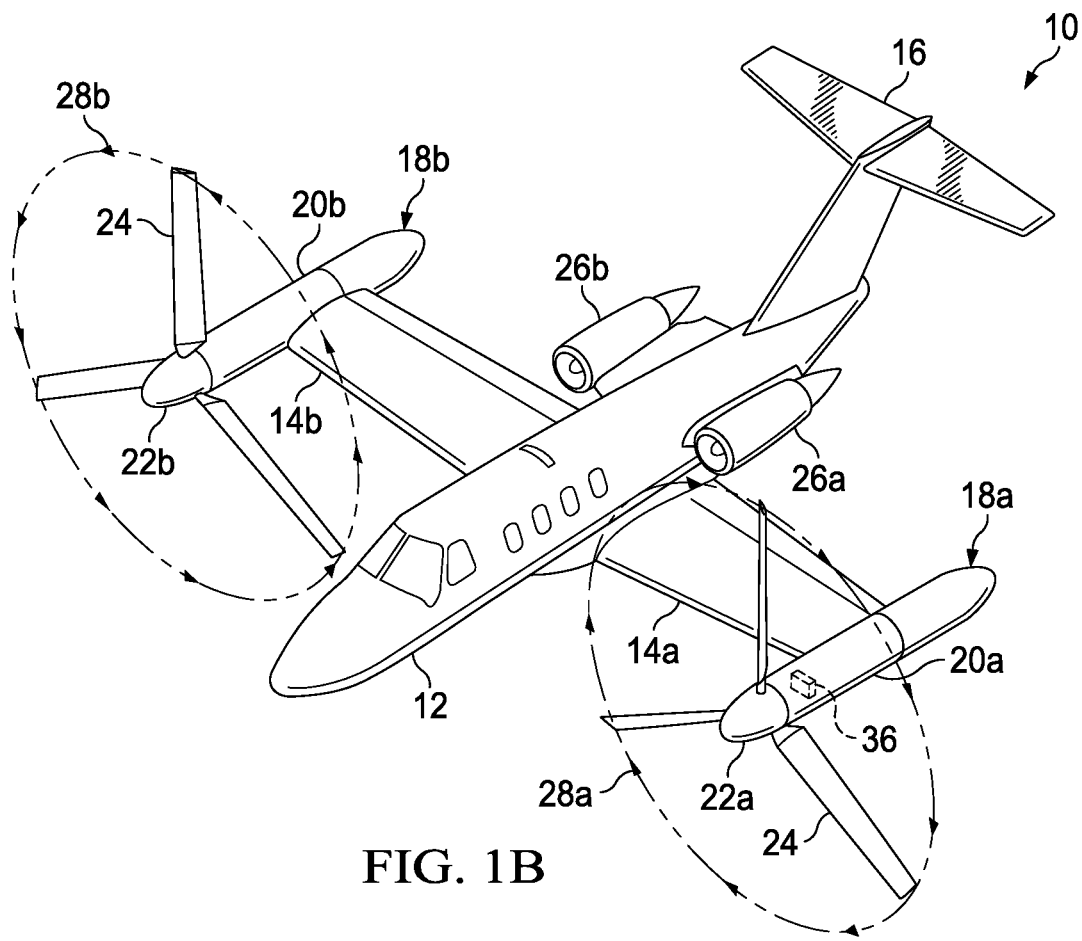
Figure 1C:
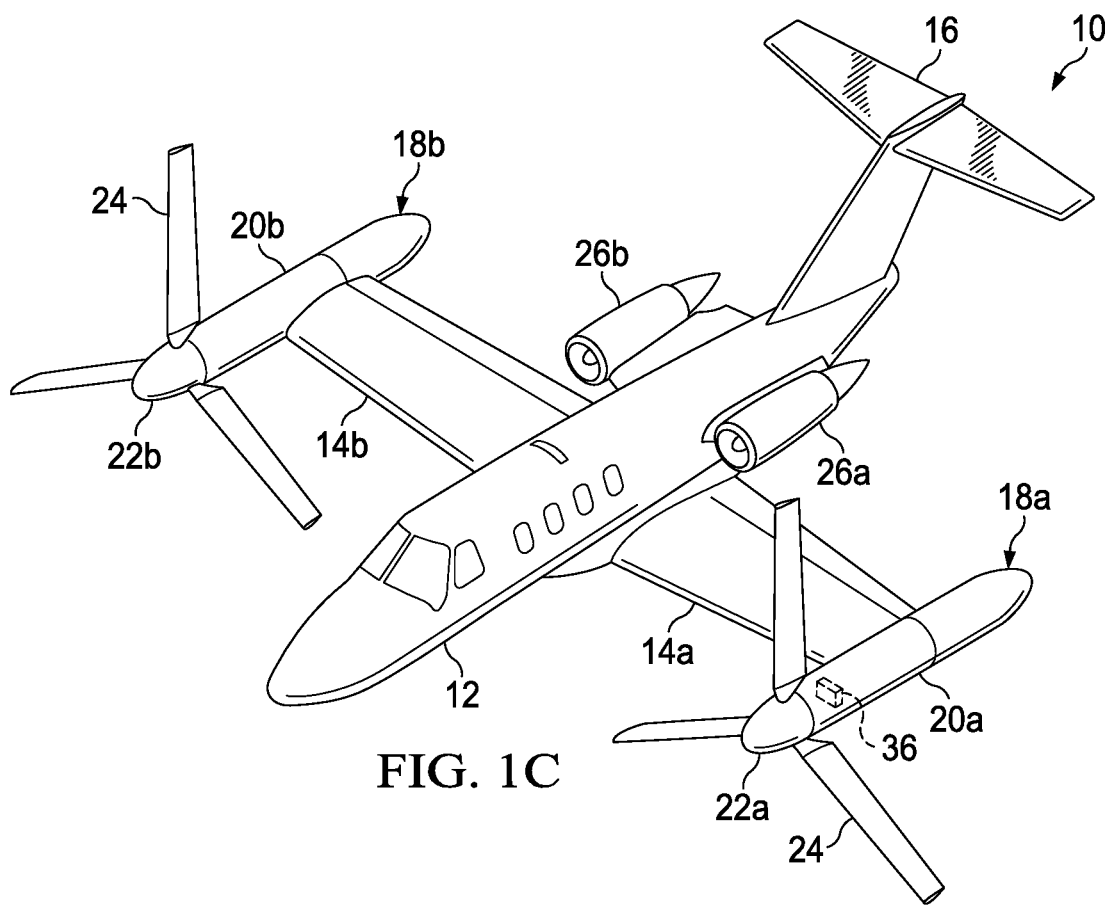
Figure 1D:
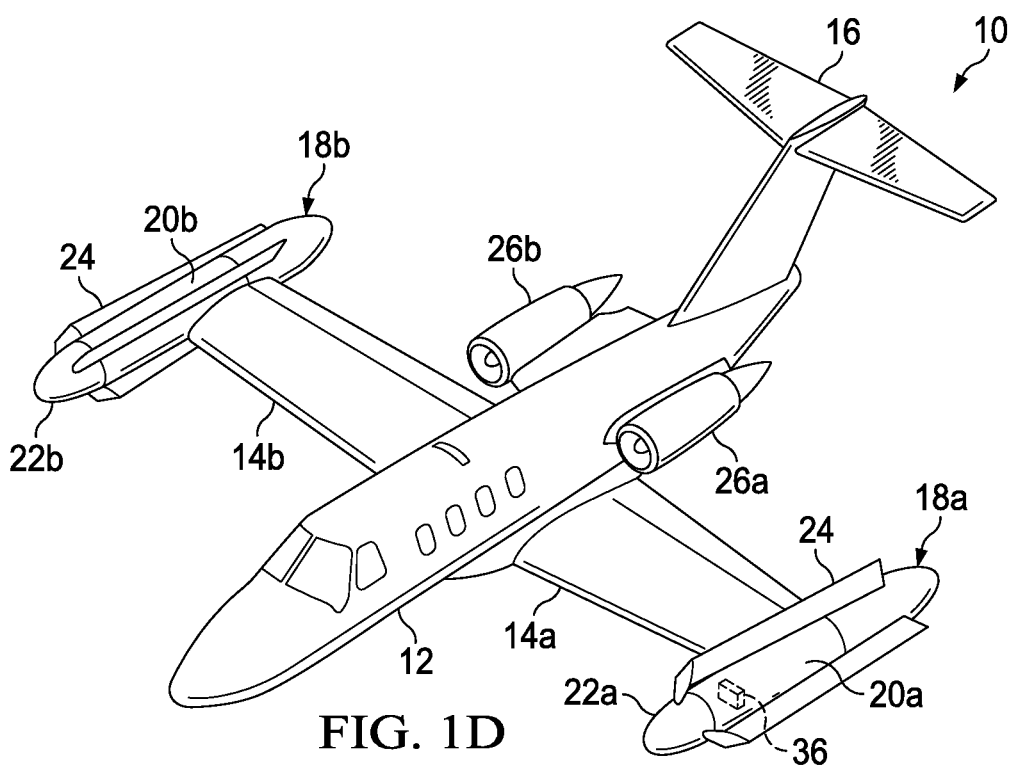

Referring to FIGS. 1A-1F in the drawings, a tiltrotor aircraft is schematically illustrated and generally designated 10. Tiltrotor aircraft 10 includes a fuselage 12, wings 14a, 14b coupled to fuselage 12 and a tail assembly 16 including control surfaces operable for horizontal and/or vertical stabilization during forward flight. Located proximate the outboard ends of wings 14a, 14b are propulsion assemblies 18a, 18b including pylon assemblies 20a, 20b that are rotatable relative to wings 14a, 14b between a generally vertical orientation, as best seen in FIG. 1A, and a generally horizontal orientation, as best seen in FIGS. 1B-1D. Pylon assemblies 20a, 20b each house a portion of a drive system that is used to rotate proprotor hub assemblies 22a, 22b, respectively. Each proprotor hub assembly 22a, 22b includes a plurality of proprotor blades 24 that are operable to be rotated, as best seen in FIGS. 1A-1B, operable to be feathered, as best seen in FIG. 1C and operable to be folded, as best seen in FIG. 1D. In the illustrated embodiment, proprotor hub assembly 22a is rotated responsive to torque and rotational energy provided by engine 26a and proprotor hub assembly 22b is rotated responsive to torque and rotational energy provided by engine 26b. Engines 26a, 26b are located proximate an aft portion of fuselage 12. Engines 26a, 26b are operable in a turboshaft mode, as best seen in FIGS. 1A-1B and a turbofan mode, as best seen in FIGS. 1C-1D.

FIG. 1A illustrates tiltrotor aircraft 10 in VTOL or helicopter flight mode, in which proprotor hub assemblies 22a, 22b are rotating in a substantially horizontal plane to provide a lifting thrust, such that tiltrotor aircraft 10 flies much like a conventional helicopter. In this configuration, engines 26a, 26b are operable in turboshaft mode wherein hot combustion gases in each engine 26a, 26b cause rotation of a power turbine coupled to an output shaft that is used to power the drive system coupled to the respective proprotor hub assemblies 22a, 22b. Thus, in this configuration, tiltrotor aircraft 10 is considered to be in a rotary flight mode. FIG. 1B illustrates tiltrotor aircraft 10 in proprotor forward flight mode, in which proprotor hub assemblies 22a, 22b are rotating in a substantially vertical plane to provide a forward thrust enabling wings 14a, 14b to provide a lifting force responsive to forward airspeed, such that tiltrotor aircraft 10 flies much like a conventional propeller driven aircraft. In this configuration, engines 26a, 26b are operable in the turboshaft mode and tiltrotor aircraft 10 is considered to be in the rotary flight mode.

In the rotary flight mode of tiltrotor aircraft 10, proprotor hub assemblies 22a, 22b rotate in opposite directions to provide torque balancing to tiltrotor aircraft 10. For example, when viewed from the front of tiltrotor aircraft 10 in proprotor forward flight mode (FIG. 1B) or from the top in helicopter mode (FIG. 1A), proprotor hub assembly 22a rotates clockwise, as indicated by motion arrows 28a, and proprotor hub assembly 22b rotates counterclockwise, as indicated by motion arrows 28b. In the illustrated embodiment, proprotor hub assemblies 22a, 22b each include three proprotor blades 24 that are equally spaced apart circumferentially at approximately 120 degree intervals. It should be understood by those having ordinary skill in the art, however, that the proprotor hub assemblies of the present disclosure could have proprotor blades with other designs and other configurations including proprotor hub assemblies having four, five or more proprotor blades. In addition, it should be appreciated that tiltrotor aircraft 10 can be operated such that proprotor hub assemblies 22a, 22b are selectively positioned between proprotor forward flight mode and helicopter mode, which can be referred to as a conversion flight mode.

FIG. 1C illustrates tiltrotor aircraft 10 in transition between proprotor forward flight mode and airplane forward flight mode, in which engines 26a, 26b have been disengaged from proprotor hub assemblies 22a, 22b and proprotor blades 24 of proprotor hub assemblies 22a, 22b have been feathered, or oriented to be streamlined in the direction of flight, such that proprotor blades 24 act as brakes to aerodynamically stop the rotation of proprotor hub assemblies 22a, 22b. In this configuration, engines 26a, 26b are operable in turbofan mode wherein hot combustion gases in each engine 26a, 26b cause rotation of a power turbine coupled to an output shaft that is used to power a turbofan that forces bypass air through a fan duct to create forward thrust enabling wings 14a, 14b to provide a lifting force responsive to forward airspeed, such that tiltrotor aircraft 10 flies much like a conventional jet aircraft. Thus, in this configuration, tiltrotor aircraft 10 is considered to be in a non rotary flight mode. FIG. 1D illustrates tiltrotor aircraft 10 in airplane forward flight mode, in which proprotor blades 24 of proprotor hub assemblies 22a, 22b have been folded to be oriented substantially parallel to respective pylon assemblies 20a, 20b to minimize the drag force generated by proprotor blades 24. In this configuration, engines 26a, 26b are operable in the turbofan mode and tiltrotor aircraft 10 is considered to be in the non rotary flight mode. The forward cruising speed of tiltrotor aircraft 10 can be significantly higher in airplane forward flight mode versus proprotor forward flight mode as the forward airspeed induced proprotor aeroelastic instability is overcome.

Figure 1E:
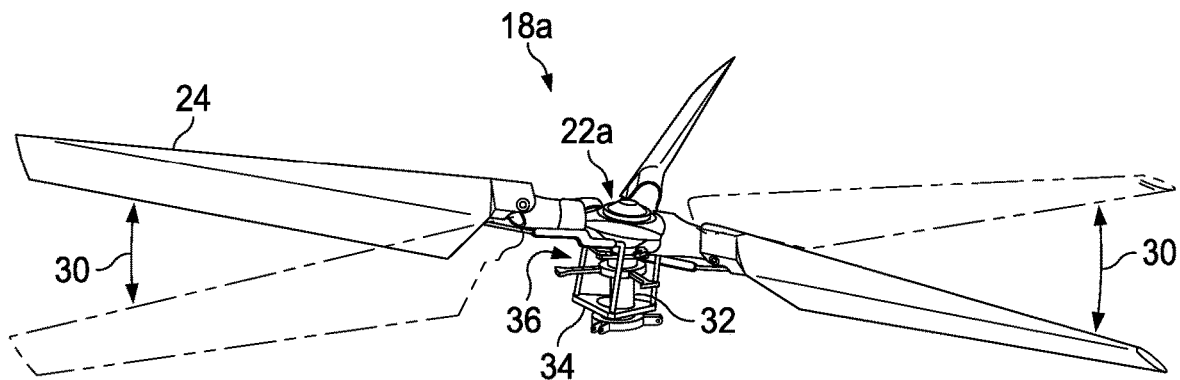

Proprotor hub assembly 22a is substantially similar to proprotor hub assembly 22b therefore, for sake of efficiency, certain features will be disclosed only with regard to proprotor hub assembly 22a. One having ordinary skill in the art, however, will fully appreciate an understanding of proprotor hub assembly 22b based on the disclosure herein of proprotor hub assembly 22a. As best seen in FIG. 1E, proprotor hub assembly 22a has a gimballing degree of freedom relative to mast 32 that is depicted with arrows 30 and the phantom rotor blades. This flapping motion allows proprotor hub assembly 22a to vary its plane of rotation. Rotor flapping capability enhances directional control of tiltrotor aircraft 10. For example, the plane of rotation of proprotor hub assembly 22a may be varied to provide forward, aft, left or right directional thrust and/or yaw or pitch control thrust for tiltrotor aircraft 10 in helicopter flight mode. The position of swashplate 34 may be used to control the amplitude of flapping motion 30. Flapping motion 30 may be managed manually by a pilot or using control laws implemented by a flight control computer onboard tiltrotor aircraft 10 or elsewhere. In various operational modes of tiltrotor aircraft 10, but especially at reduced or zero revolutions per minute (RPM) operation of proprotor hub assembly 22a, centrifugal forces may decrease and aerodynamic forces can cause large flapping motions, or overflapping, of proprotor hub assembly 22a. Overflapping can lead to mast bumping, large structural loads or even structural failure of tiltrotor aircraft 10.

Figure 1F:
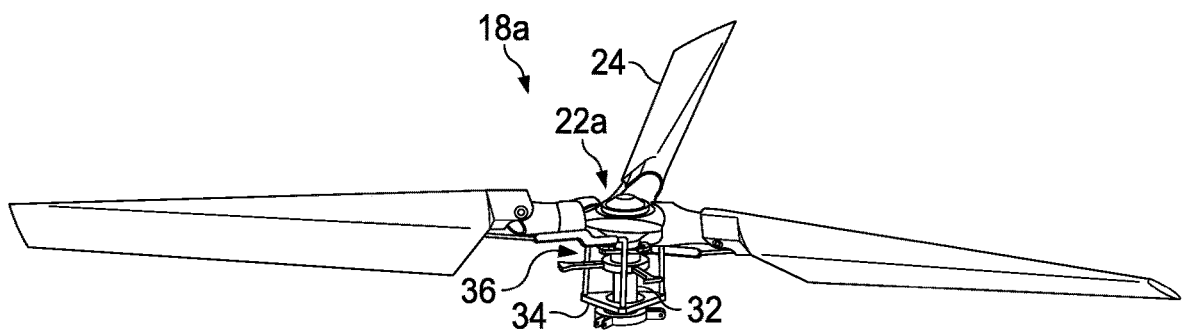

Propulsion assembly 18a includes a gimbal lock 36 positioned about and movable along mast 32 to enable or disable gimballing degree of freedom 30 of proprotor hub assembly 22a. In FIG. 1E, gimballing degree of freedom 30 is unlocked and rotor flapping is enabled. In FIG. 1F, gimballing degree of freedom 30 is locked and rotor flapping is disabled. Gimbal lock 36 moves between the disengaged position of FIG. 1E and the engaged position of FIG. 1F depending on the operational circumstances. In one scenario, gimbal lock 36 is engaged to lock out gimballing degree of freedom 30 at reduced or zero RPM operation of proprotor hub assembly 22a. For example, gimbal lock 36 may be engaged when proprotor hub assembly 22a is being slowed to a stop and feathered in turbofan or non rotary flight mode as shown in FIG. 1C and/or in preparation for folding proprotor blades 24 as shown in FIG. 1D. Gimbal lock 36 may include one or more hooks capable of hooking to proprotor hub assembly 22a in the engaged position, thereby preventing gimbal lock 36 from being forced out of the engaged position by the flapping moments of proprotor hub assembly 22a. Gimbal lock 36 may be disengaged after unfolding proprotor blades 24 in preparation for transitioning into turboshaft or rotary flight mode.

Even though tiltrotor aircraft 10 has been described as having two engines fixed to the fuselage each operating a respective proprotor hub assembly 22a, 22b in the rotary flight mode, it should be understood by those having ordinary skill in the art that other engine arrangements are possible and are considered to be within the scope of the present disclosure including, for example, having a single engine that provides torque and rotational energy to both proprotor hub assemblies 22a, 22b. In addition, even though proprotor hub assemblies 22a, 22b are illustrated in the context of tiltrotor aircraft 10, it should be understood by those having ordinary skill in the art that the proprotor hub assemblies disclosed herein can be implemented on other tiltrotor aircraft including, for example, quad tiltrotor aircraft having one or more additional wing members aft of wings 14a, 14b, unmanned tiltrotor aircraft or other tiltrotor aircraft configurations. It should be appreciated that tiltrotor aircraft 10 is merely illustrative of a variety of aircraft that can implement the embodiments disclosed herein. Indeed, gimbal lock 36 may be utilized on any aircraft having one or more rotors. Other aircraft implementations can include hybrid aircraft, compound aircraft, tiltwing aircraft, quad tiltrotor aircraft, helicopters, propeller airplanes, unmanned aerial systems and the like. As such, those skilled in the art will recognize that gimbal lock 36 disclosed herein can be integrated into a variety of aircraft configurations. It should be appreciated that even though aircraft are particularly well-suited to implement the embodiments of the present disclosure, non-aircraft vehicles and devices can also implement the embodiments.

Figure 2A:
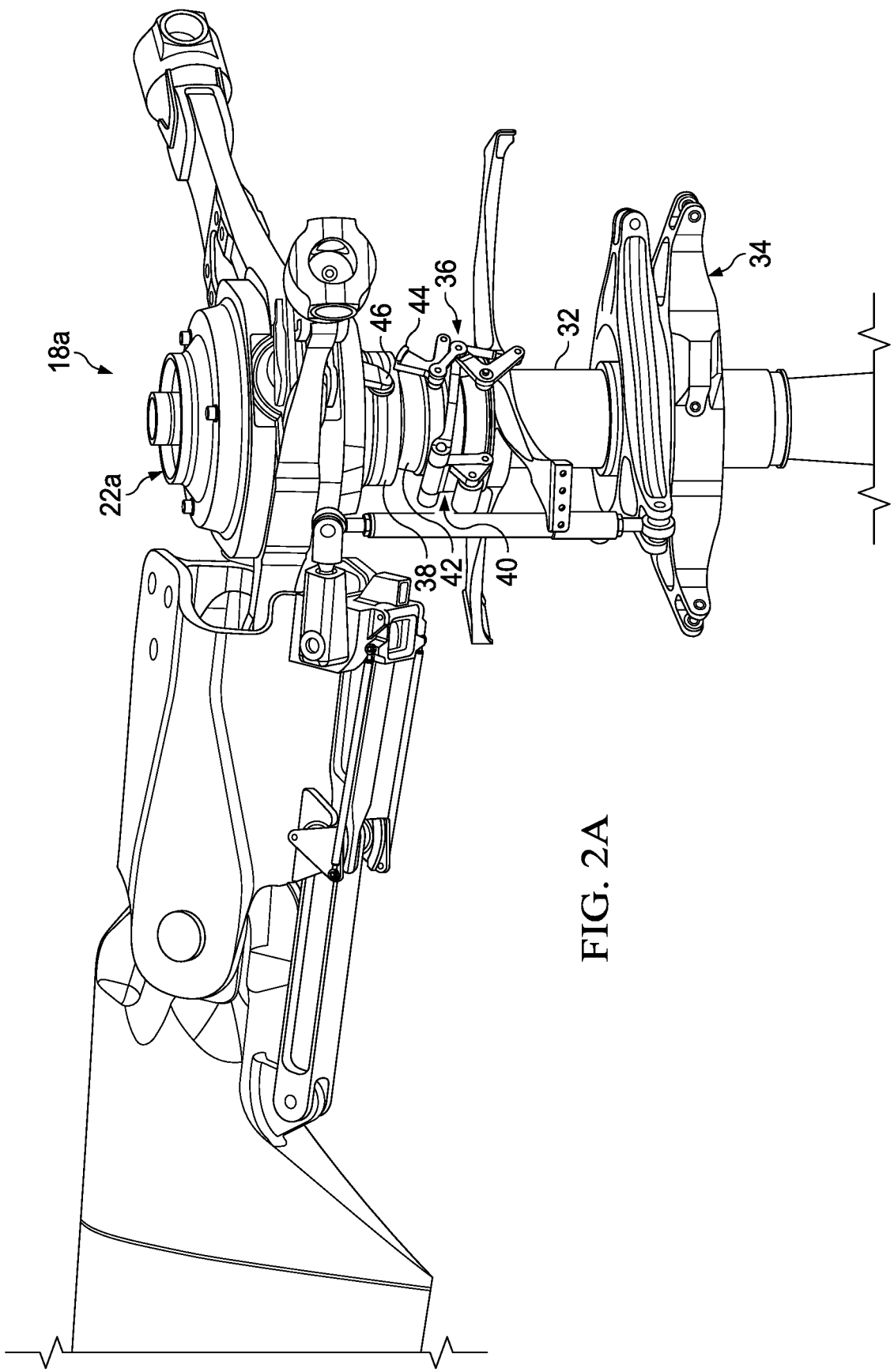
FIGS. 2A-2B are isometric views of a proprotor hub assembly in accordance with embodiments of the present disclosure.
Figure 2B:
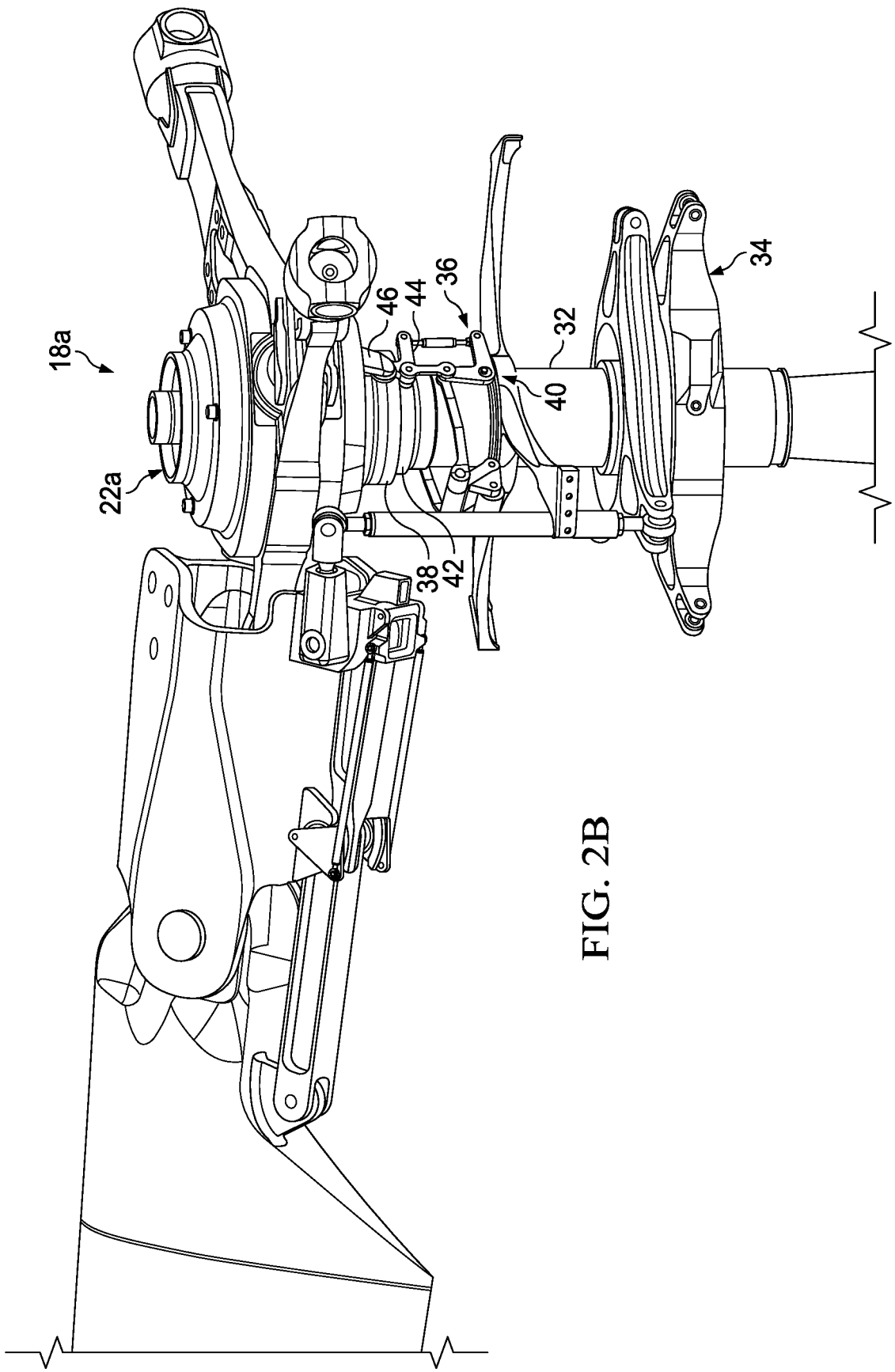

Referring to FIGS. 2A-2B in the drawings, propulsion assembly 18a includes proprotor hub assembly 22a coupled to mast 32. Proprotor hub assembly 22a includes a gimbal lock receptacle 38 extending from proprotor hub assembly 22a. Gimbal lock 36 is coupled to and operable to rotate with mast 32. Gimbal lock 36 includes an actuation assembly 40 to raise and lower locking ring 42. Gimbal lock 36 is operable to selectively enable and disable the gimballing degree of freedom of proprotor hub assembly 22a relative to mast 32. As best seen in FIG. 2A, gimbal lock 36 is disengaged from proprotor hub assembly 22a, which enables the gimballing degree of freedom of proprotor hub assembly 22a. Locking ring 42 does not contact gimbal lock receptacle 38 in the disengaged position. In this configuration, there is an axial separation between locking ring 42 of gimbal lock 36 and gimbal lock receptacle 38 of proprotor hub assembly 22a such that any teetering or flapping motion of proprotor hub assembly 22a is not impacted by gimbal lock 36. When it is desired to transition the tiltrotor aircraft from the rotary flight mode to the non rotary flight mode, proprotor hub assembly 22a may be stabilized at or near an orthogonal position relative to mast 32 by the manual or automated control of swashplate 34 to allow locking ring 42 to be inserted into gimbal lock receptacle 38. Actuation assembly 40 may be operated to raise locking ring 42 into gimbal lock receptacle 38 of proprotor hub assembly 22a. In this configuration, as best seen in FIG. 2B, gimbal lock 36 is engaged with gimbal lock receptacle 38 of proprotor hub assembly 22a, which disables the gimballing degree of freedom of proprotor hub assembly 22a relative to mast 32 for non rotary flight.

In the illustrated embodiment, gimbal lock 36 includes two gimbal lock hooks 44 disposed on opposite sides of mast 32. Proprotor hub assembly 22a includes two corresponding hook receivers 46 also disposed on opposite sides of mast 32. In the disengaged position shown in FIG. 2A, gimbal lock hooks 44 are unhooked from hook receivers 46. In the engaged position shown in FIG. 2B, gimbal lock hooks 44 are coupled to hook receivers 46 to secure locking ring 42 to gimbal lock receptacle 38 of proprotor hub assembly 22a.

Gimbal lock hooks 44 prevent locking ring 42 from being squeezed out of gimbal lock receptacle 38 in response to the flapping moments of proprotor hub assembly 22a. When engaged, gimbal lock hooks 44 and hook receivers 46 provide load paths between locking ring 42 and proprotor hub assembly 22a. One of the problems suffered by current gimbal locks is the loss of stiffness caused by the transmission of flapping moments to surrounding components, which can result in deflection of the input lever responsible for lifting the gimbal lock into position. The load paths formed by gimbal lock hooks 44 and hook receivers 46 limit stress and deformation forces on the surrounding components of proprotor hub assembly 22a, gimbal lock 36 and other adjacent systems to maintain stiffness of gimbal lock 36 after repeated and/or rigorous use. In the illustrated embodiment, locking ring 42 is annular, conical and has a geometry that is configured to mate with a similar, complementary geometry of gimbal lock receptacle 38, thus disabling the gimballing degree of freedom of proprotor hub assembly 22a relative to mast 32 in the engaged position. It should be appreciated, however, that the exact mating geometry of locking ring 42 and gimbal lock receptacle 38 is implementation specific and not limited to the illustrated geometry. Locking ring 42 and gimbal lock receptacle 38 may be formed from any material capable of withstanding the flapping moments of proprotor hub assembly 22a, including a hard metallic material such as steel. Locking ring 42 may also be coated with a more pliable material, such as Dacron or Teflon, to act as a bumper, especially while locking ring 42 is between the engaged and disengaged positions.

The operation of gimbal lock 36 will now be described with reference to an exemplary flight of tiltrotor aircraft 10 in FIGS. 1A-1D. For vertical takeoff and hovering in helicopter flight mode, as best seen in FIG. 1A, and low speed forward flight in proprotor flight mode, as best seen in FIG. 1B, tiltrotor aircraft 10 is in rotary flight mode. To achieve this operational mode, engines 26a, 26b are in turboshaft mode to provide torque and rotational energy to proprotor hub assemblies 22a, 22b and gimbal lock 36 is in the disengaged position to enable the gimballing degree of freedom of proprotor hub assembly 22a and permit flapping of proprotor hub assembly 22a, as best seen in FIG. 2A. Although gimbal lock 36 is disengaged, control laws implemented by the flight control computer may actively reduce flapping of proprotor hub assembly 22a during certain maneuvers in proprotor forward flight mode. When it is desired to transition tiltrotor aircraft 10 from low speed forward flight in proprotor forward flight mode, as best seen in FIG. 1B, to high speed forward flight in airplane forward flight mode, as best seen in FIG. 1D, the gimballing degree of freedom of proprotor hub assembly 22a is disabled by actuation assembly 40 raising locking ring 42 into gimbal lock receptacle 38 of proprotor hub assembly 22a and hooking gimbal lock hooks 44 to hook receivers 46, as best seen in FIG. 2B. Tiltrotor aircraft 10 is now in airplane forward flight mode, which is the high speed forward flight mode of tiltrotor aircraft 10 and is a non rotary flight mode. In this operational mode, engines 26a, 26b are in turbofan mode providing no torque or rotational energy to proprotor hub assemblies 22a, 22b and gimbal lock 36 is in the engaged position disabling the gimballing degree of freedom of proprotor hub assembly 22a, thus stabilizing proprotor hub assembly 22a. When it is desired to transition back to proprotor forward flight mode, as best seen in FIG. 1B, from airplane forward flight mode, as best seen in FIG. 1D, the gimballing degree of freedom of proprotor hub assembly 22a may again be enabled by actuation assembly 40 lowering locking ring 42 out of engagement with gimbal lock receptacle 38 of proprotor hub assembly 22a and unhooking gimbal lock hooks 44 from hook receivers 46, as best seen in FIG. 2A. In some embodiments, gimbal lock 36 is disengaged from gimbal lock receptacle 38 when proprotor hub assembly 22a is at or near an RPM level sufficient for proprotor forward flight mode. Engines 26a, 26b are then transitioned from turbofan mode to turboshaft mode such that forward thrust is provided by proprotor hub assemblies 22a, 22b and tiltrotor aircraft 10 is in rotary flight mode. From this configuration, tiltrotor aircraft 10 may now be transitioned to helicopter mode when it is desired to hover and/or land the aircraft.

Figure 3D:
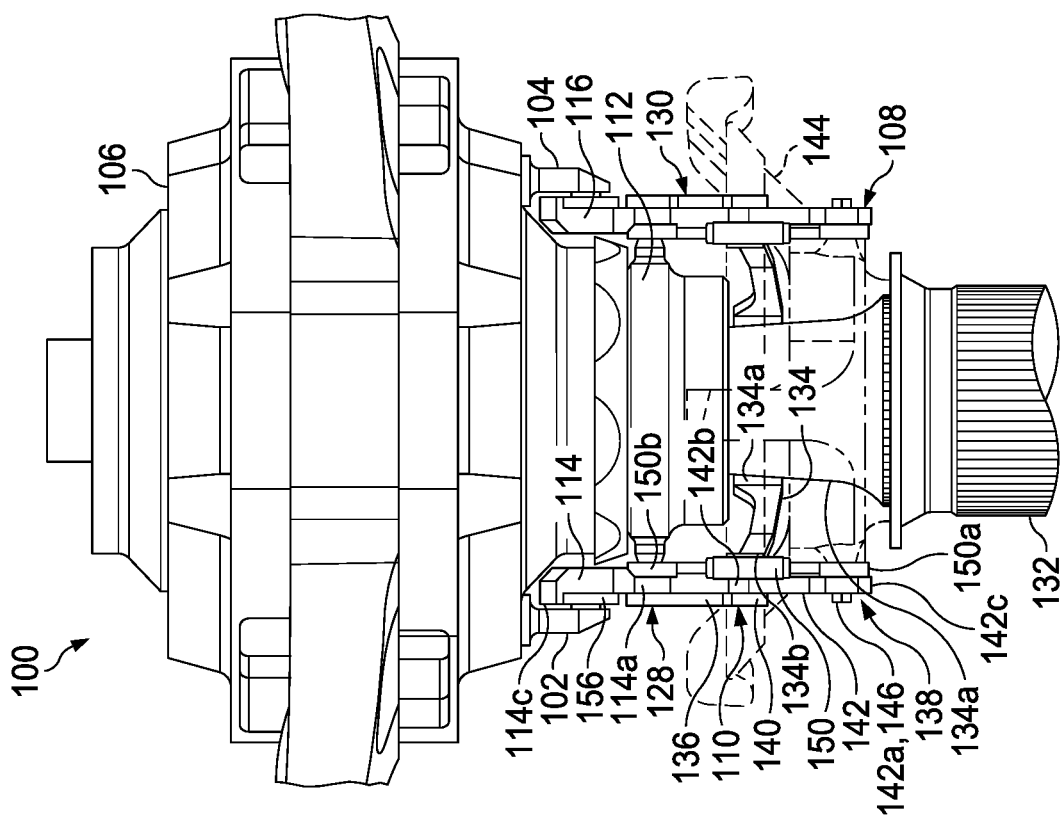
Figure 3C:
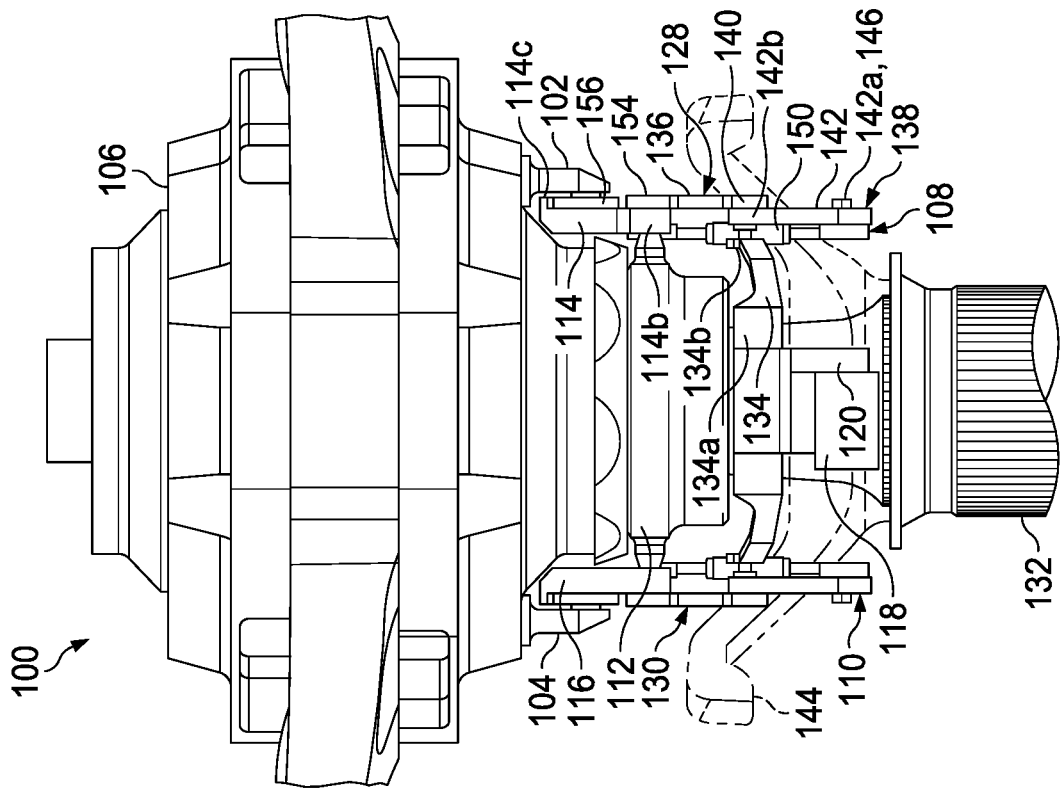

Referring to FIGS. 3A-3D in the drawings, a propulsion assembly including a gimbal lock hooking system is schematically illustrated and generally designated 100. Hook receivers 102, 104 extend from proprotor hub assembly 106 in the aft direction. Gimbal lock 108 includes actuation assembly 110 to raise and lower locking ring 112 and rotate gimbal lock hooks 114, 116. In particular, actuation assembly 110 lowers locking ring 112 and unhooks gimbal lock hooks 114, 116 from hook receivers 102, 104 in the disengaged position, as shown in FIG. 3A, and raises locking ring 112 and hooks gimbal lock hooks 114, 116 to hook receivers 102, 104 in the engaged position, as shown in FIGS. 3B-3D. Actuation assembly 110 includes a rotary actuator 118 that has an angular output. Rotary actuator 118 may also utilize a rotary gear box 120 and/or an idler 122 to impart motion upon the remainder of actuation assembly 110. Rotary actuator 118 provides angular output in directions 124, 126 to drive both locking ring 112 and gimbal lock hooks 114, 116. For example, rotary actuator 118 moves in direction 124 to lower locking ring 112 and unhook gimbal lock hooks 114, 116 from hook receivers 102, 104. Rotary actuator 118 moves in direction 126 to raise locking ring 112 and hook gimbal lock hooks 114, 116 to hook receivers 102, 104. Gimbal lock 108 may achieve superior failure modes by the use of rotary actuator 118 rather than by using a linear actuator, screw actuator or other actuator type. However, it will be appreciated by one of ordinary skill in the art that locking ring 112 may be raised or lowered and gimbal lock hooks 114, 116 may be rotated using any type of actuator, including a linear actuator or screw actuator.

Actuation assembly 110 is bifurcated into two sides 128, 130 on opposite sides of mast 132. Hook receiver 102 and gimbal lock hook 114 are on the opposite side of mast 132 than hook receiver 104 and gimbal lock hook 116. Hook receiver 102, gimbal lock hook 114 and side 128 of actuation assembly 110 are substantially similar to hook receiver 104, gimbal lock hook 116 and side 130 of actuation assembly 110 therefore, for sake of efficiency, certain features will be disclosed only with regard to hook receiver 102, gimbal lock hook 114 and side 128 of actuation assembly 110. One having ordinary skill in the art, however, will fully appreciate an understanding of hook receiver 104, gimbal lock hook 116 and side 130 of actuation assembly 110 based upon the disclosure herein of hook receiver 102, gimbal lock hook 114 and side 128 of actuation assembly 110.

Actuation assembly 110 includes an arm 134 having an end 134a rotatably coupled to rotary actuator 118. End 134b of arm 134 is rotatably coupled to a locking ring linkage 136 and a hook linkage subassembly 138. End 134b of arm 134, locking ring linkage 136 and hook linkage subassembly 138 are rotatably coupled to one another at a common revolute joint 140. Locking ring linkage 136 links arm 134 to locking ring 112 to drive axial motion of locking ring 112 in response to the force provided by rotary actuator 118. Hook linkage subassembly 138 links arm 134 to gimbal lock hook 114 to drive rotational motion of gimbal lock hook 114 in response to the force provided by rotary actuator 118. Hook linkage subassembly 138 includes an angle, or "L", bracket 142 rotatable about a vertex 142a. Vertex 142a of angle bracket 142 is rotatably coupled to a base 144 by a fastener 146. End 142b of angle bracket 142 is rotatably coupled to end 134b of arm 134 at revolute joint 140. While angle bracket 142 is illustrated to approximate an "L" shape, angle bracket 142 may form any angle 148, such as an acute or obtuse angle. Hook linkage subassembly 138 also includes a riser 150 having a bottom end 150a rotatably coupled to end 142c of angle bracket 142. Top end 150b of riser 150 is rotatably coupled to a leg 114a of gimbal lock hook 114. Riser 150 has an adjustable length to vary the distance between end 142c of angle bracket 142 and leg 114a of gimbal lock hook 114. The adjustability of riser 150 may be used to coordinate or synchronize the axial motion of locking ring 112 with the rotation of gimbal lock hook 114 as rotary actuator 118 moves in either direction 124, 126.

Gimbal lock hook 114 forms an angle 152 including a vertex 114b rotatably coupled to locking ring 112. Locking ring 112, locking ring linkage 136 and vertex 114b of gimbal lock hook 114 are rotatably coupled at a common revolute joint 154. Gimbal lock hook 114 includes a lip 114c protruding radially outward from mast 132. Lip 114c may have tapered ends to facilitate sliding across receiver ring 156 of hook receiver 102. Receiver ring 156 may be rotatable to slidably receive and release lip 114c of gimbal lock hook 114. Other hooking techniques and configurations are within the scope of the illustrative embodiments, including magnetic or electromagnetic hooks. Although gimbal lock 108 includes two gimbal lock hooks 114, 116, gimbal lock 108 may utilize any number of gimbal lock hooks and corresponding hook receivers to secure locking ring 112 to proprotor hub assembly 106.

Figure 4:
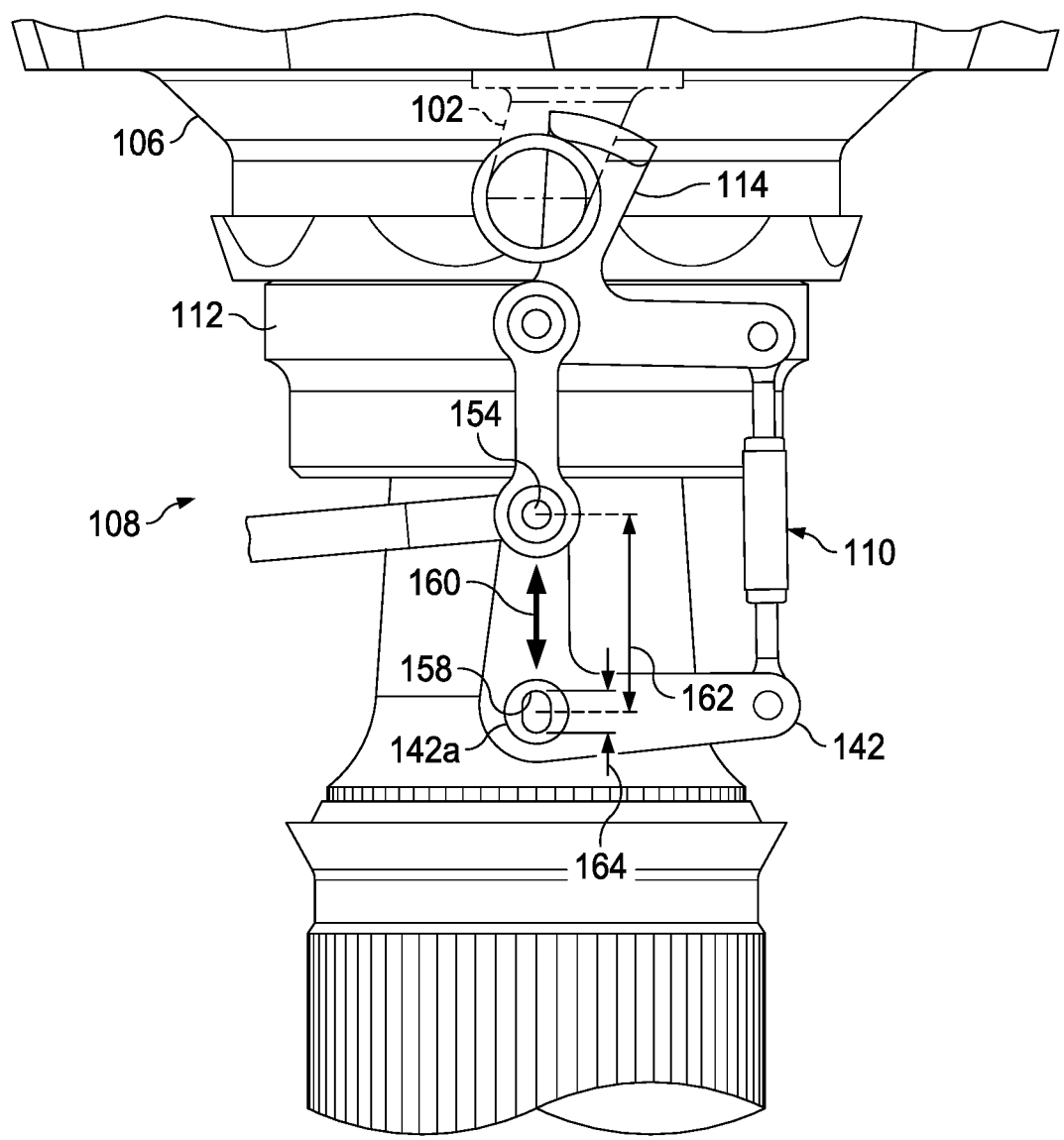
FIG. 4 is a side view of a gimbal lock in accordance with embodiments of the present disclosure.

Referring to FIG. 4 in the drawings, fastener 146 in FIGS. 3A-3D has been removed to expose an elongated slot 158 formed at vertex 142a of angle bracket 142. Fastener 146 of FIGS. 3A-3D is movable along elongated slot 158 to permit angle bracket 142 to move in the forward or aft direction 160. In operation, elongated slot 158 permits angle bracket 142 to move toward proprotor hub assembly 106 in response to locking ring 112 engaging with proprotor hub assembly 106, which allows locking ring 112 to remain engaged with proprotor hub assembly 106 as gimbal lock hook 114 continues to be rotated by actuation assembly 110 into full engagement with hook receiver 102. Angle bracket 142 may be pulled upward toward proprotor hub assembly 106 any time after locking ring 112 engages with proprotor hub assembly 106. Angle bracket 142 may also fall downward away from proprotor hub assembly 106 when locking ring 112 disengages from proprotor hub assembly 106. Distance 162 between revolute joint 154 and fastener 146 in FIGS. 3A-3D varies as gimbal lock 108 moves between the disengaged and engaged positions. Elongated slot 158 may be any length 164 to control distance 162.

Figure 5A:
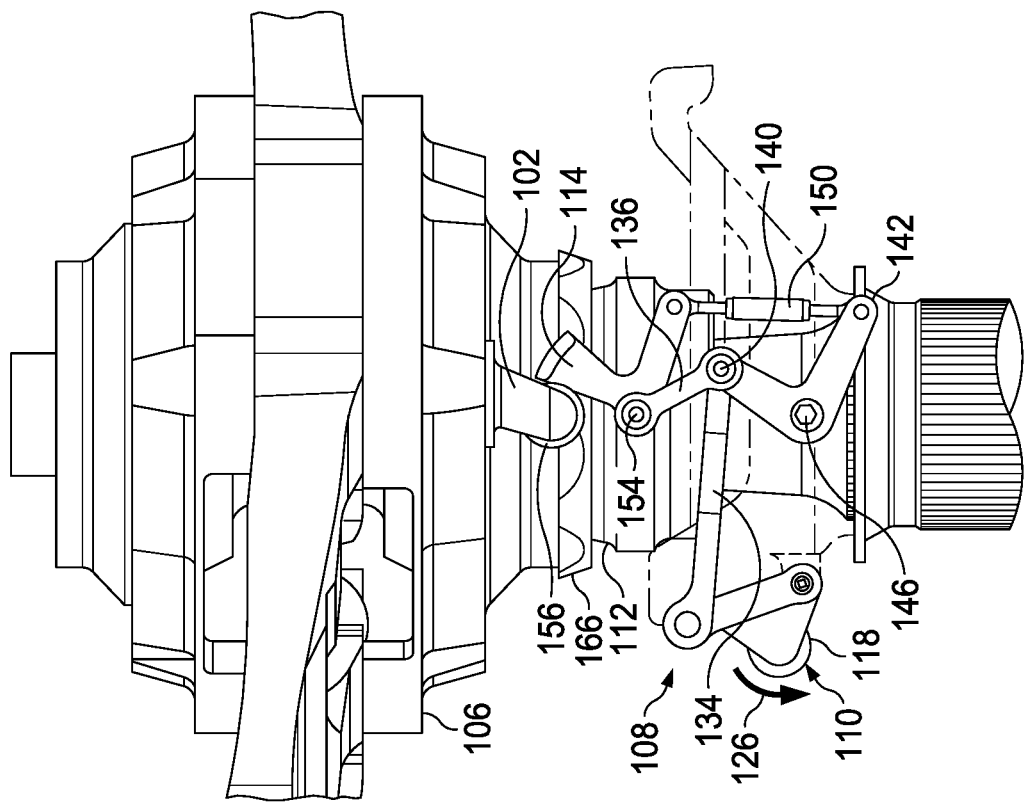
FIGS. 5A-5D are side views of a gimbal lock hooking system shown in sequential movement from a disengaged position to an engaged position in accordance with embodiments of the present disclosure.
Figure 5B:
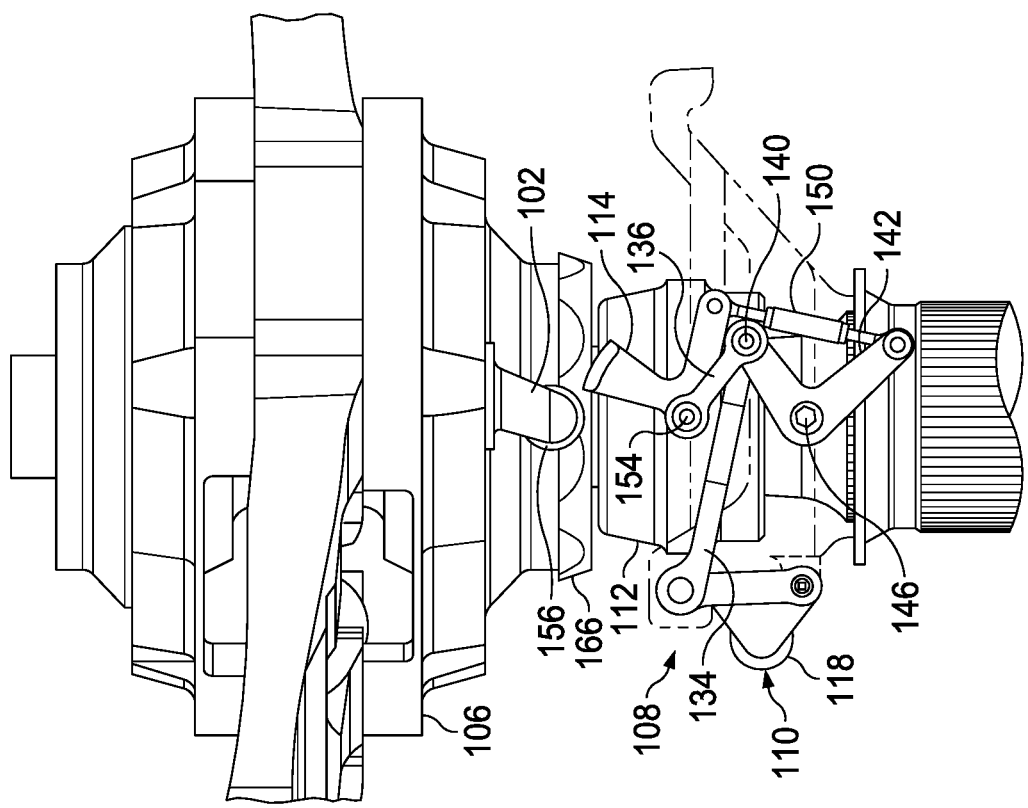

Referring to FIGS. 5A-5D, the operation of gimbal lock 108 as it moves from the disengaged position to the engaged position is schematically illustrated. In FIG. 5A, gimbal lock 108 is in the disengaged position. In the disengaged position locking ring 112 is not inserted into gimbal lock receptacle 166 of proprotor hub assembly 106 and gimbal lock hook 114 is unhooked from hook receiver 102. In FIG. 5B, rotary actuator 118 has commenced angular motion in direction 126. While actuation assembly 110 is capable of driving both axial movement of locking ring 112 and rotation of gimbal lock hook 114 by the unidirectional movement of rotary actuator 118, in some embodiments the engagement and disengagement of gimbal lock 108 may occur in two phases: a locking ring axial displacement phase and a gimbal lock hook rotation phase. In FIG. 5B, gimbal lock 108 may be considered to be in the locking ring axial displacement phase in which actuation assembly 110 is primarily, but not necessarily exclusively, directed toward the axial displacement of locking ring 112 rather than the rotation of gimbal lock hook 114. In this phase, arm 134 is pulled by rotary actuator 118 to move locking ring linkage 136 toward a substantial vertical alignment, thereby pushing locking ring 112 upward. The rotation of gimbal lock hook 114 is less pronounced in this phase.

Figure 5C:
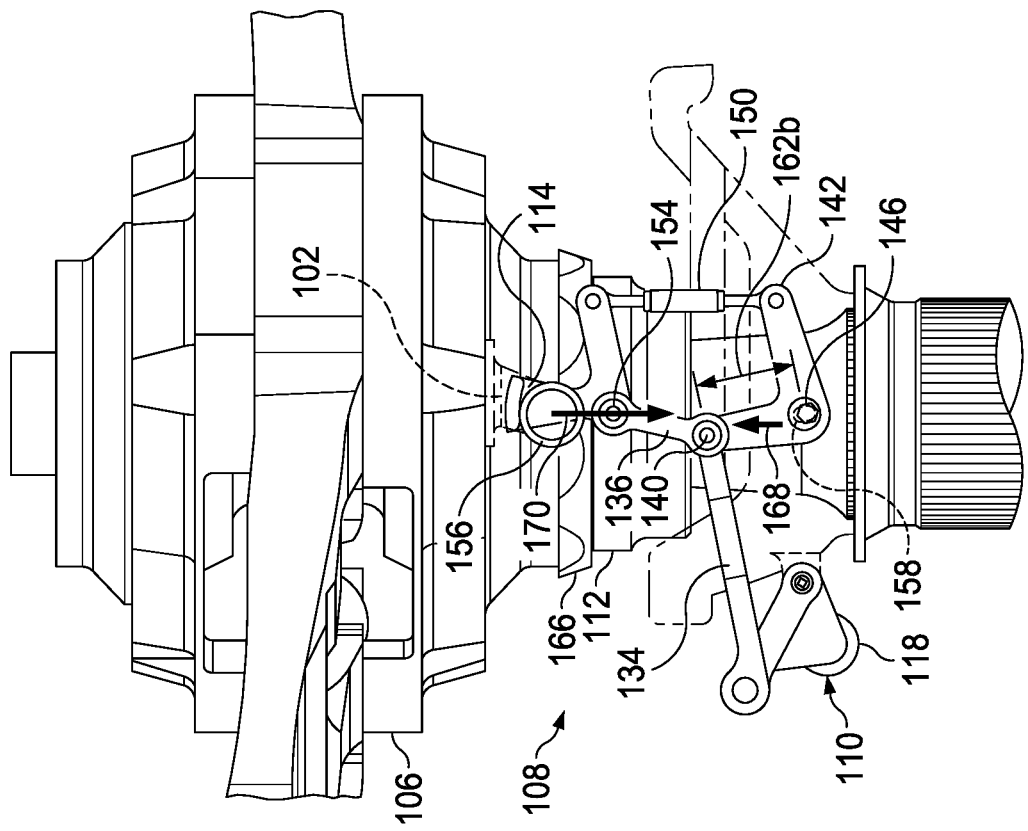

In FIG. 5C, locking ring linkage 136 has been moved into vertical alignment to fully engage locking ring 112 with gimbal lock receptacle 166, thus completing the locking ring axial displacement phase of engaging gimbal lock 108. However, the gimbal lock hook rotation phase, in which the motion of actuation assembly 110 is primarily, but not necessarily exclusively, directed toward the rotation of gimbal lock hook 114, remains in progress. Because the locking ring axial displacement phase and the gimbal lock hook rotation phase are offset from one another, locking ring 112 fully engages with proprotor hub assembly 106 prior to gimbal lock hook 114 fully hooking to hook receiver 102 as gimbal lock 108 moves from the disengaged position to the engaged position. In the gimbal lock hook rotation phase, the movement of rotary actuator 118 in direction 126 causes vertical displacement of riser 150 and therefore rotation of gimbal lock hook 114. The length of riser 150 may be adjusted to vary the timing between the full engagement of locking ring 112 with gimbal lock receptacle 166 and the complete hooking of gimbal lock hook 114 onto hook receiver 102, thereby coordinating or synchronizing the locking ring axial displacement phase with the gimbal lock hook rotation phase.

Figure 5D:
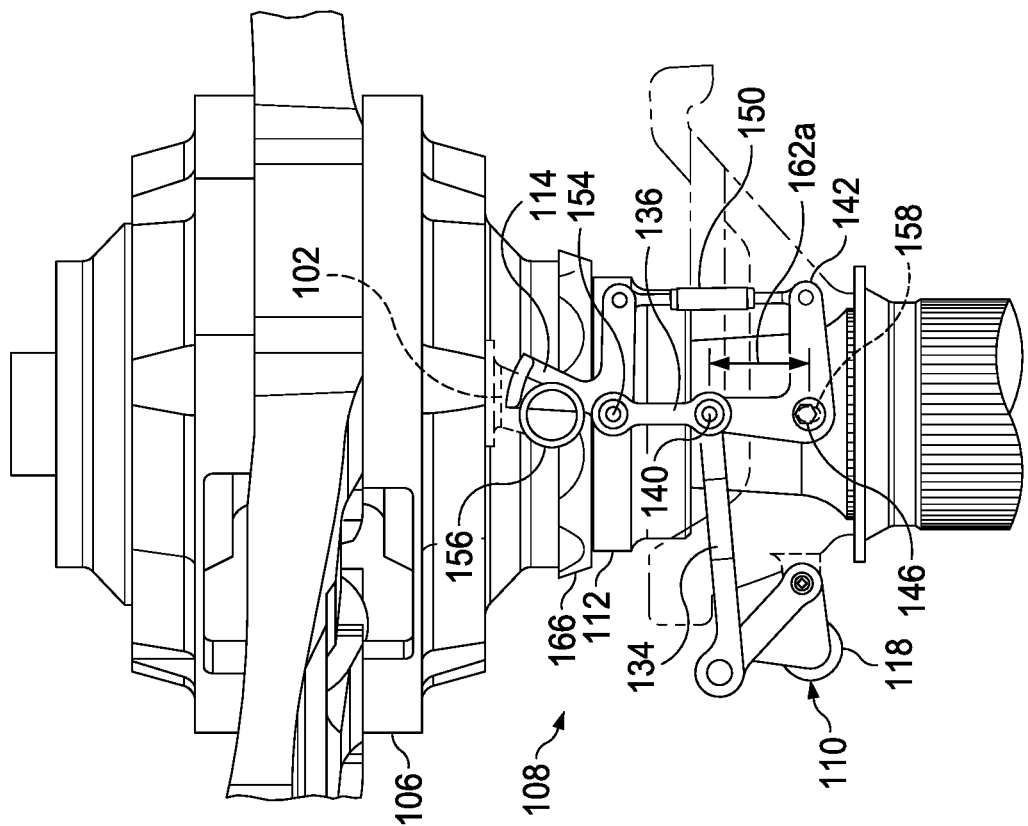
Figure 6A:
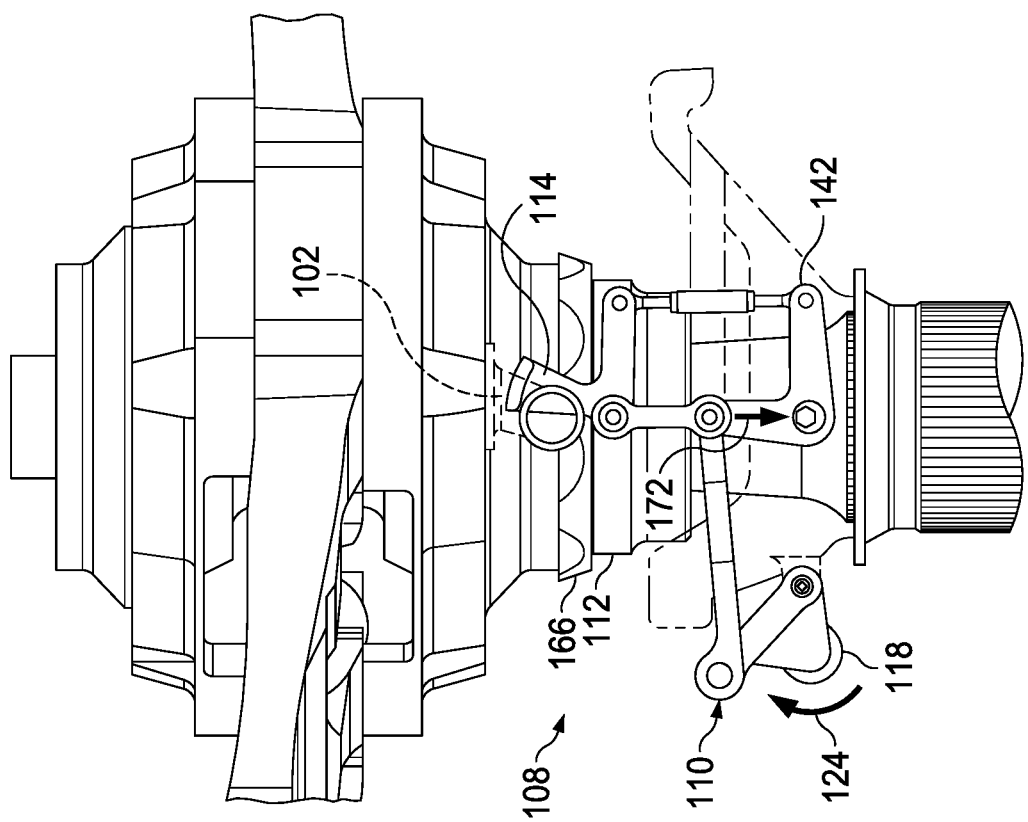
FIGS. 6A-6D are side views of a gimbal lock hooking system shown in sequential movement from an engaged position to a disengaged position in accordance with embodiments of the present disclosure.
Figure 6B:
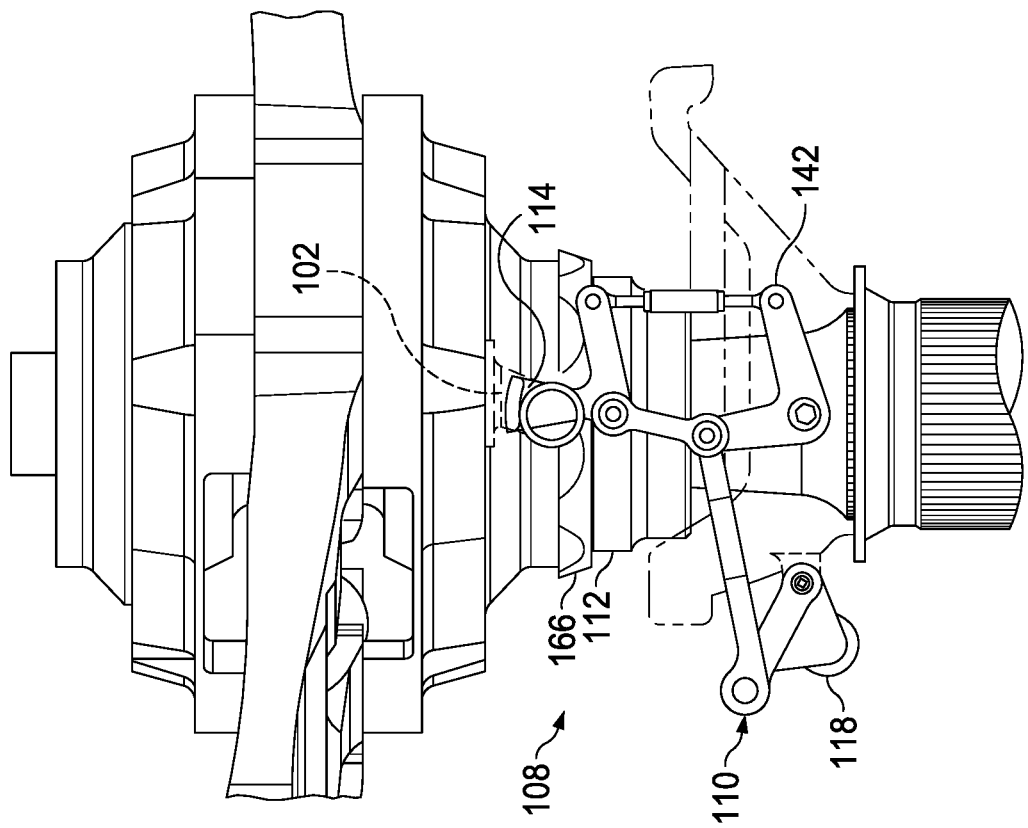
Figure 6C:
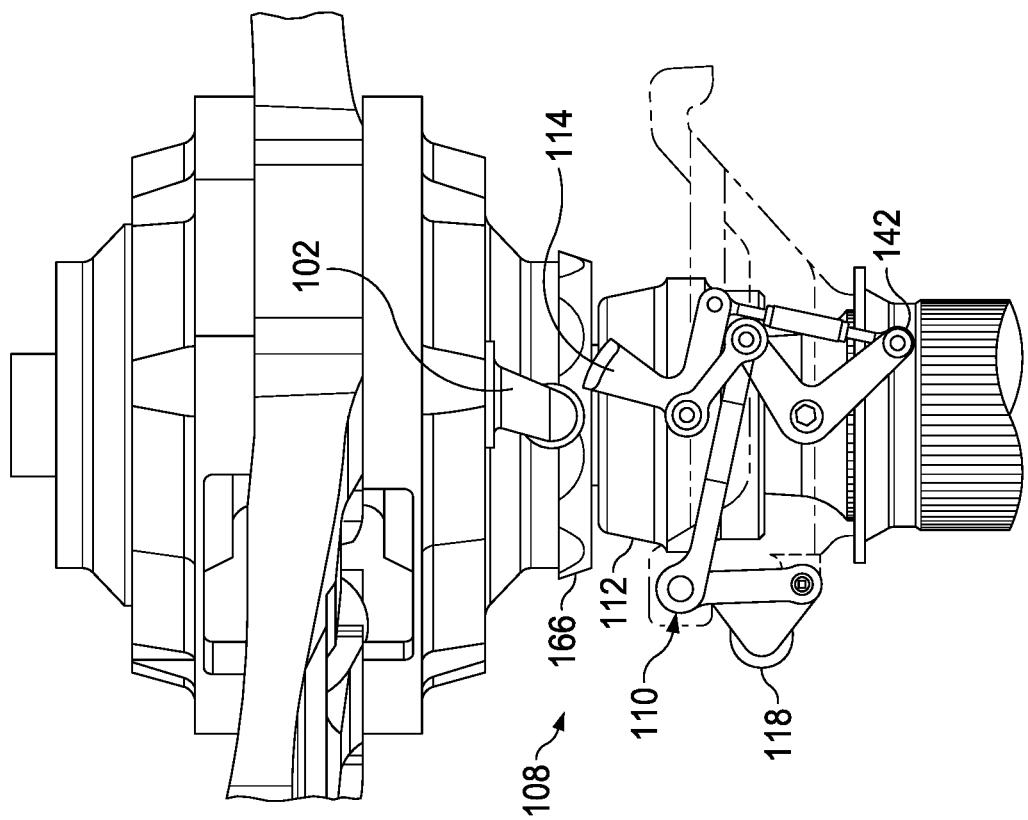
Figure 6D:
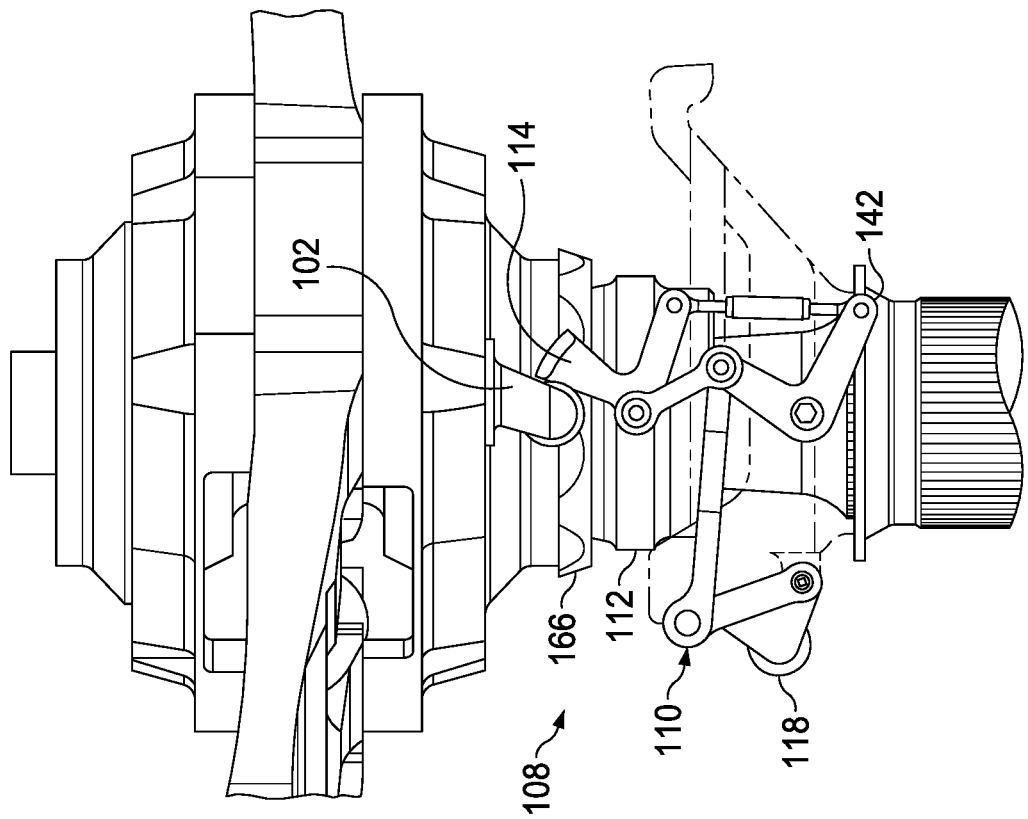

In FIG. 5C, revolute joints 140, 154 and fastener 146 are substantially vertically aligned and angle bracket 142 is rotationally oriented such that fastener 146 is permitted to move freely along elongated slot 158. Thus, as rotary actuator 118 continues to pull locking ring linkage 136 out of vertical alignment as in FIG. 5D, angle bracket 142 is pulled in upward direction 168 to increase distance 162b between revolute joint 140 and fastener 146. Distance 162b is greater than distance 162a between revolute joint 140 and fastener 146 prior to the upward shift of angle bracket 142 toward proprotor hub assembly 106. Further movement of rotary actuator 118 after angle bracket 142 shifts upward rotates gimbal lock hook 114 into the hooked position while the increased distance 162b between revolute joint 140 and fastener 146 allows locking ring 112 to remain engaged with gimbal lock receptacle 166. Elongated slot 158 allows angle bracket 142 to be pulled upward so that locking ring 112 is not pulled downward as locking ring linkage 136 is pulled out of vertical alignment as shown in FIG. 5D. Elongated slot 158 also allows gimbal lock hook 114 to be pulled in downward direction 170 into a tight engagement with receiver ring 156 so that gimbal lock hook 114 and hook receiver 102 are preloaded to act as a localized load path for flapping forces exerted by proprotor hub assembly 106. When locking ring 112 is fully engaged with gimbal lock receptacle 166 and gimbal lock hook 114 is securely hooked and/or preloaded onto receiver ring 156 as shown in FIG. 5D, gimbal lock 108 is in the engaged position. Gimbal lock hook 114 prevents locking ring 112 from being pushed out of gimbal lock receptacle 166 due to the flapping moments caused by proprotor hub assembly 106, thereby maintaining stiffness between locking ring 112 and gimbal lock receptacle 166. The localized load path between locking ring 112 and gimbal lock receptacle 166 formed by hook receiver 102 and gimbal lock hook 114 prevents high loads from passing through surrounding components, such as arm 134. Hook receiver 102 and gimbal lock hook 114 may have a shallow engagement geometry that forces locking ring 112 into gimbal lock receptacle 166 as gimbal lock hook 114 is being hooked onto hook receiver 102.

Referring to FIGS. 6A-6D in the drawings, the operation of gimbal lock 108 as it moves from the engaged position to the disengaged position is schematically illustrated. As gimbal lock 108 moves out of the engaged position shown in FIG. 6A, rotary actuator 118 moves in direction 124 to begin unhooking gimbal lock hook 114 from hook receiver 102 in the gimbal lock hook rotation phase. Once angle bracket 142 is in the rotational alignment shown in FIG. 6B, angle bracket 142 moves back downward in direction 172 as gimbal lock 108 begins the locking ring axial displacement phase shown in FIG. 6C in which actuation assembly 110 displaces locking ring 112 from gimbal lock receptacle 166. Rotary actuator 118 continues rotating in direction 124 until locking ring 112 is fully disengaged from gimbal lock receptacle 166 and gimbal lock hook 114 is fully unhooked from hook receiver 102 in the disengaged position shown in FIG. 6D.

Figure 7:
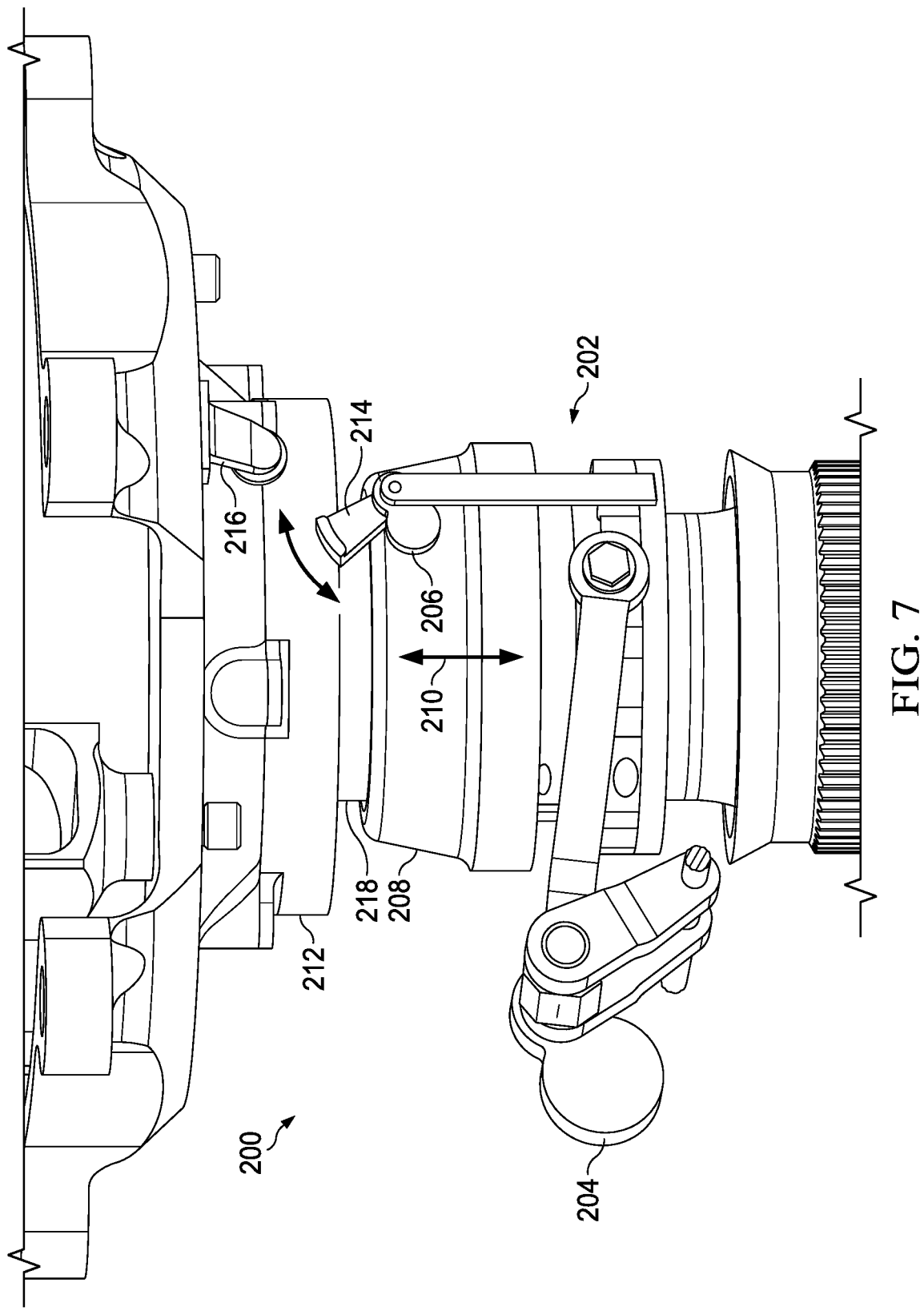
FIG. 7 is an isometric view of a gimbal lock hooking system in accordance with embodiments of the present disclosure.

Referring to FIG. 7 in the drawings, a gimbal lock hooking system is schematically illustrated and generally designated 200. Gimbal lock 202 includes two actuators: a locking ring actuator 204 and a hook actuator 206. Locking ring actuator 204 moves locking ring 208 between the disengaged position and the engaged position along axial direction 210. When locking ring 208 is engaged with gimbal lock receptacle 212, hook actuator 206 rotates gimbal lock hook 214 into engagement with hook receiver 216. Thus, locking ring 208 and gimbal lock hook 214 may be actuated individually by separate actuators 204, 206 instead of by the motion of a single actuator as described in the previous illustrative embodiments. Locking ring actuator 204 and hook actuator 206 may be any type of actuator, such as a rotary or linear actuator, and any number of such actuators may be used to drive locking ring 208 and gimbal lock hook 214. In addition, gimbal lock 202 may utilize any number of gimbal lock hooks around mast 218, and each gimbal lock hook may be individually actuated by a respective actuator.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion assembly for a rotorcraft comprising:
a mast;
a proprotor hub assembly coupled to the mast and having a gimballing degree of freedom relative to the mast, the proprotor hub assembly including a hook receiver; and
a gimbal lock positioned about the mast, the gimbal lock including a locking ring, a gimbal lock hook and an actuation assembly, the actuation assembly configured to raise and lower the locking ring and rotate the gimbal lock hook;
wherein, the gimbal lock is movable between a disengaged position and an engaged position relative to the proprotor hub assembly, the gimbal lock enabling the gimballing degree of freedom in the disengaged position and disabling the gimballing degree of freedom in the engaged position; and
wherein, the gimbal lock hook is hooked to the hook receiver in the engaged position to secure the locking ring to the proprotor hub assembly.

2. The propulsion assembly as recited in claim 1, wherein the proprotor hub assembly further comprises a gimbal lock receptacle extending from the proprotor hub assembly and adapted to receive the locking ring, the locking ring inserted into the gimbal lock receptacle in the engaged position.

3. The propulsion assembly as recited in claim 1, wherein the hook receiver further comprises a receiver ring.

4. The propulsion assembly as recited in claim 3, wherein the receiver ring is rotatable to slidably receive and release the gimbal lock hook.

5. The propulsion assembly as recited in claim 1, wherein the gimbal lock hook forms a lip protruding radially outward from the mast.

6. The propulsion assembly as recited in claim 1, wherein the gimbal lock hook and the hook receiver provide a load path between the locking ring and the proprotor hub assembly in the engaged position.

7. The propulsion assembly as recited in claim 1, wherein the gimbal lock hook is unhooked from the hook receiver in the disengaged position.

8. The propulsion assembly as recited in claim 1, wherein the actuation assembly has a range of motion including a locking ring axial displacement phase and a gimbal lock hook rotation phase.

9. The propulsion assembly as recited in claim 1, wherein the actuation assembly further comprises an actuator moveable in a first direction to raise the locking ring and hook the gimbal lock hook to the hook receiver and a second direction to lower the locking ring and unhook the gimbal lock hook from the hook receiver.

10. The propulsion assembly as recited in claim 9, wherein the actuation assembly further comprises:
an arm having first and second ends, the first end of the arm coupled to the actuator;
a locking ring linkage coupling the second end of the arm to the locking ring; and
a hook linkage subassembly coupling the second end of the arm to the gimbal lock hook.

11. The propulsion assembly as recited in claim 10, wherein the second end of the arm, the locking ring linkage and the hook linkage subassembly are rotatably coupled at a common revolute joint.

12. The propulsion assembly as recited in claim 10, wherein the hook linkage subassembly further comprises:
an angle bracket rotatable about a vertex and having first and second ends, the first end of the angle bracket coupled to the second end of the arm; and
a riser having a bottom end coupled to the second end of the angle bracket and a top end coupled to the gimbal lock hook.

13. The propulsion assembly as recited in claim 12, wherein the vertex of the angle bracket forms an elongated slot permitting the angle bracket to move toward the proprotor hub assembly in response to the locking ring engaging with the proprotor hub assembly.

14. The propulsion assembly as recited in claim 12, wherein the gimbal lock hook further comprises a leg coupled to the top end of the riser and wherein the gimbal lock hook forms an angle including a vertex coupled to the locking ring.

15. The propulsion assembly as recited in claim 14, wherein the locking ring, the locking ring linkage and the vertex of the gimbal lock hook are rotatably coupled at a common revolute joint.

16. A tiltrotor aircraft comprising:
a fuselage;
a wing coupled to the fuselage; and
a propulsion assembly rotatably coupled to the wing, the propulsion assembly comprising:
a mast;
a proprotor hub assembly coupled to the mast and having a gimballing degree of freedom relative to the mast, the proprotor hub assembly including first and second hook receivers; and
a gimbal lock positioned about the mast, the gimbal lock including a locking ring and first and second gimbal lock hooks;
wherein, the gimbal lock is movable between a disengaged position and an engaged position relative to the proprotor hub assembly, the gimbal lock enabling the gimballing degree of freedom in the disengaged position and disabling the gimballing degree of freedom in the engaged position; and
wherein, the gimbal lock hooks are hooked to the hook receivers in the engaged position to secure the locking ring to the proprotor hub assembly.

17. The tiltrotor aircraft as recited in claim 16, wherein the first hook receiver and the first gimbal lock hook are disposed on an opposite side of the mast than the second hook receiver and the second gimbal lock hook.

18. The tiltrotor aircraft as recited in claim 16, wherein the locking ring fully engages with the proprotor hub assembly prior to the gimbal lock hooks fully hooking to the hook receivers as the gimbal lock moves from the disengaged position to the engaged position.

19. The tiltrotor aircraft as recited in claim 16, wherein the locking ring further comprises a conical and annular locking ring.

* * * * *